United States Patent [19]

Kamikubota et al.

[11] Patent Number: 4,903,056
[45] Date of Patent: Feb. 20, 1990

[54] CAMERA HAVING CHECKING FUNCTION

[75] Inventors: Masafumi Kamikubota; Masamichi Sato, both of Tokyo, Japan

[73] Assignee: Fuji Photo Film Co., Ltd., Kanagawa, Japan

[21] Appl. No.: 276,165

[22] Filed: Nov. 23, 1988

[30] Foreign Application Priority Data

Nov. 24, 1987 [JP] Japan .................. 62-294187
Oct. 17, 1988 [JP] Japan .................. 63-259512

[51] Int. Cl.$^4$ .............................. G03B 29/00
[52] U.S. Cl. ...................... 354/76; 354/219
[58] Field of Search ............ 354/75, 76, 219, 432

[56] References Cited

U.S. PATENT DOCUMENTS

| 3,883,883 | 5/1975 | Sano et al. | 354/219 |
| 4,303,322 | 12/1981 | Someya | 354/432 |
| 4,704,022 | 11/1987 | Nozawa et al. | 354/219 |
| 4,716,470 | 12/1987 | Levine | 354/432 |

Primary Examiner—Russell E. Adams
Attorney, Agent, or Firm—Sughrue, Mion, Zinn, Macpeak & Seas

[57] ABSTRACT

A camera having checking function in which part of a light beam passing through the conjugate system of the camera lens unit is taken out. The light beam taken is passed through a focusing optical system to focus an optical image on an imaging device, and the imaging device outputs a picture signal corresponding to the optical image focused.

7 Claims, 9 Drawing Sheets

CAMERA HAVING CHECKING FUNCTION

BACKGROUND OF THE INVENTION

This invention relates to a silver-halide film camera which enables checking of the image to be photographed during photographing (immediately prior to photographing) or of the photographed image immediately after photographing.

It is sometimes desired to check an image photographed on a film during photographing. If this is possible, it will be convenient because the photographer is able to check during photographing prior to developing that the subject is photographed as expected. This will also allow selection prior to developing of those which are to be printed.

As cameras having a checking function meeting the above requirements, there have been proposed a single-lens reflex camera as shown in FIG. 8, a single-lens reflex camera as shown in FIG. 9, and a single-lens reflex camera as shown in FIG. 10.

In the single-lens reflex camera as shown in FIG. 8, when the shutter button is not pressed, a light beam passing through a camera lens 01 and reflected by a quick-return mirror 02 focuses an image of the subject on a focus plate 03. The subject image is applied to an imaging device 08 through a pentagonal prism 04 of a finder unit, a right-angle prism 05, and lenses 06 and 07. On the other hand, when the shutter button is pressed, the quick-return mirror 02 swings up, and the light beam passing through the camera lens 01 is applied to a film 09 to photograph the subject image.

In the single-lens reflex camera as shown in FIG. 9, when the shutter button is not pressed, a light beam passing through a camera lens 010 and reflected by a quick-return mirror 011 is applied to a finder 014 through a lens 012 and a transfer mirror 013. On the other hand, when the shutter button is pressed, the quick-return mirror swings up and a shutter 015 opens, the light beam passing through the camera lens 010 is applied to a film 018 through a half mirror 016 and a lens 017 and, at the same time, part of the light beam is reflected by the half mirror 016 and applied to an imaging device 022 through a lens 019 and filters 020 and 021.

In the single-lens reflex camera as shown in FIG. 10, a rear conversion lens assembly 027 is inserted between camera lenses 025 and a camera body assembly 026. The rear conversion lens assembly 027 incorporates rear conversion lenses 028 and 029, a beam splitters 030, lenses 031 and 032, and an imaging device 033. The camera body assembly 026 incorporates a quick-return mirror 034, pentagonal prism 035, and an eye-piece lens 036. In this type of camera, part of light beam passing through the camera lenses 025 is reflected by the beam splitter 030 and applied to the imaging device 033.

In the camera as shown in FIG. 8, since the solid-state imaging device 08 is incorporated in the finder system, the image taken by the solid-state imaging device 08 differs in timing, to the extent of the operation time of the quick-return mirror 02, from that taken by the film 09. Thus, for example, if a person as the subject blinks while the quick-return mirror 02 is operating, image of the subject with closed eyes is taken by the film 09, whereas that with open eyes is outputted by the solid-state imaging device.

For the case of the camera as shown in FIG. 9 and FIG. 10, on the other hand, the half mirror 011 and the beam splitter 030 are disposed between the camera lens system and the film to split the light beam to the focusing lens system and solid-state imaging device 014 and 033. In this case, the image taken by the solid-state imaging devices is the same as that taken by the film, but such arrangement is defective, among others, in that the optional system to conduct light to the solid-state imaging devices 014 and 033 is large in size.

With a view to obviate the prior art defects of cameras with a checking function, it is primary object of the present invention to provide a camera with a checking function to enable immediate checking during photographing of the image taken by the film, which can provide the same image as that taken by the film as an output of the solid-state imaging device.

SUMMARY OF THE INVENTION

In accordance with the present invention which attains the above object, there is provided a camera with a checking function characterized in that part of a light beam passing through a camera lens assembly as a conjugate system is taken out and passed through a focusing lens system to focus the light beam on an imaging device, and the imaging device outputs a picture signal corresponding to the focused optical image.

DESCRIPTION OF PREFERRED EMBODIMENTS

Figure 1:
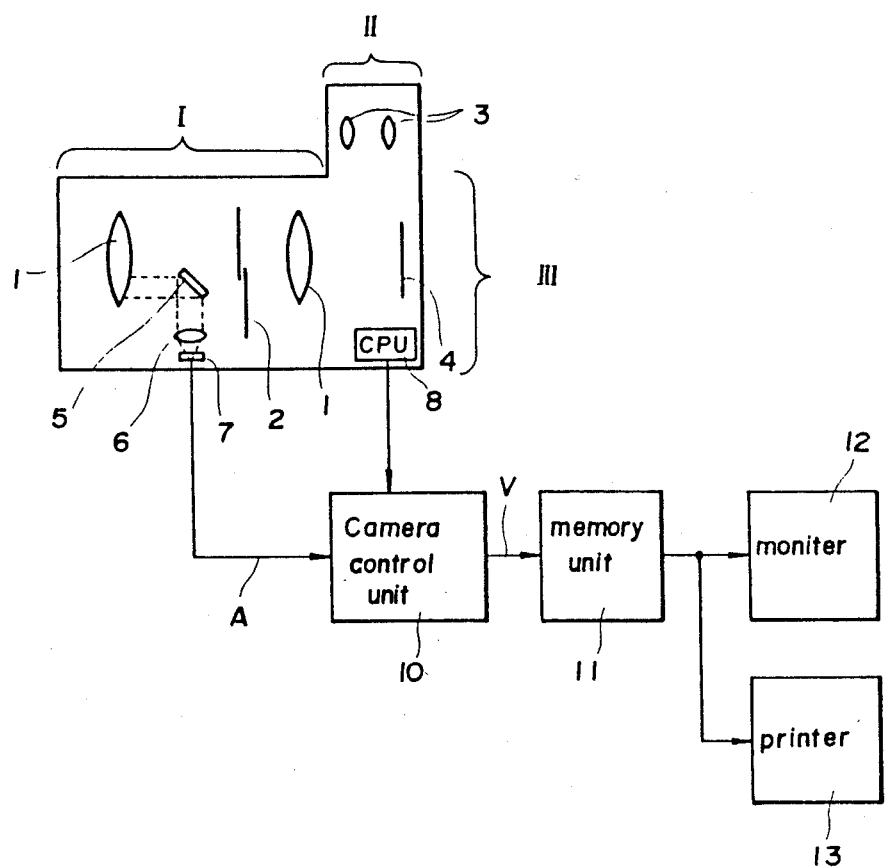
FIG. 1 is a diagrammatic view showing a first embodiment of the present invention.

Preferred embodiments of the present invention will now be described in detail with reference to the drawings. FIG. 1 shows a first embodiment of the present invention which is applied to a lens-shutter camera. In this type of camera, a camera lens unit I incorporates camera lenses 1 and a shutter/iris stop unit 2, a finder unit II incorporates finder lenses 3, and a film 4 is set in position in a camera body III. In the camera body III are also disposed a central processing unit (CPU) 8 to calculate exposure and focal length and control operations of various components in the camera, and a power supply (not shown).

In this embodiment, a mirror 5 is disposed in the conjugate system of the camera lens unit I, at a subject-side position of the shutter/iris stop unit 2. The mirror 5 reflects part of incident light beam to a direction perpendicular to the incident light axis. A focusing optical system 6 is disposed at a position where the light beam reflected by the mirror 5 is incident, to focus the incident light beam into an image. A imaging device 7, composed of a solid-state imaging device such as a CCD, is disposed at a position where an image is focused by the focusing optical system 6 and outputs a picture signal A corresponding to the focused image of the subject (optical image). Supply of power to the imaging device 7 begins when the shutter button is pressed to turn on the release switch, and ends when winding up of the film 4 starts. An electronic shutter of the imaging device 7 operates during the power supply period.

In this embodiment, since part of the incident light beam is taken out by the mirror 5 at the conjugate system, the amount of light incident upon the film 4 is reduced by the amount taken by the mirror 5, but the entire part of the subject image is taken by the film 4. Even if the area of the mirror 5 is decreased to reduce light beam taken by the mirror, the image focused by the focusing optical system 6 represents the entire part of the subject. Therefore, in this embodiment, sizes of the mirror 5, the focusing optical system 6, and the imaging device 7 are reduced as much as possible. In the figure, the camera lenses 1, and finder lenses 3, and the focusing optical system 6 are shown in simplified forms.

The imaging device 6 is connected with a camera control unit 10, a memory unit 11, a monitor 12, and a printer 13.

Figure 2:
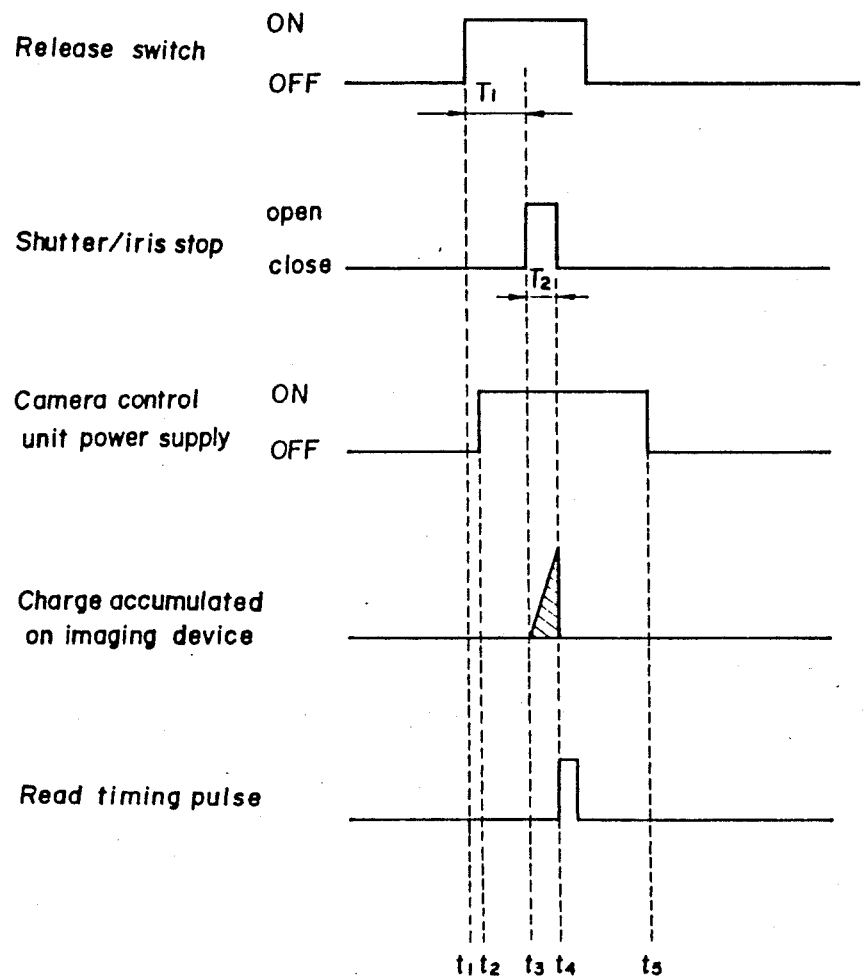
FIG. 2 is a timing chart showing operation of the first embodiment of the present invention.

Operation of the first embodiment will now be described with reference to FIG. 1 and FIG. 2 which shows operation timing.

(i) When the shutter button of the camera is pressed to turn on the release switch (at time t1), the CPU 8, from detection signals outputted from an exposure sensor and a distance sensor, calculates correct exposure and distance. In dependence on the calculated distance, the position of the camera lens 1 is adjusted into focus.

Furthermore, by instructions of the CPU 8, the camera control unit 10 is energized and, at the same time, the camera control unit 10 begins to supply power to the imaging device 7 (time t2).

(ii) Time T1 after the release switch is turned on, the shutter/iris stop unit 2 opens for a period of T2 (for example, 1/2,000 second). At this time, the aperture of the shutter/iris stop unit 2 is adjusted to a correct aperture according to the previously calculated correct exposure and shutter speed (T2). When the shutter/iris stop unit 2 is opened, a greater part of the light beam passes through the shutter/iris stop unit 2 to the film 4, and the image of the subject is taken by the film 4. At the same time, part of the light beam is reflected by the mirror 5 and passes through the focusing optical system 6 to the imaging device 7. As a result, the image of the subject is produced on the imaging device 7.

(iii) The camera control unit 10, in response to instructions of the CPU 8, operates the electronic shutter of the imaging device 7 synchronizing with the shutter timing of the shutter/iris stop unit 2. Thus, from the time (time t3) when the shutter/iris stop unit 2 is opened, the imaging device 7 begins to accumulate electrical charges generated by photoelectric conversion and, when the shutter/iris stop unit 2 is closed (time t4), outputs a read pulse to read the accumulated electrical charges. The electrical charges thus read are outputted as a picture signal A corresponding to the image of the subject.

(iv) At the time the film 4 begins to be wound, the camera control unit 10 and the imaging device 7 are de-energized (time t5).

(v) The picture signal A is processed by the camera control unit 10 into a video signal V. The video signal V is once stored in a memory unit 11 and then read and transmitted to the monitor 12 or the printer 13. As a result, after the shutter button is pressed, the same image of the subject as taken by the film 4 can be immediately displayed on the monitor 12 or hard-copied by the printer 13, thus enabling checking of the image at the time of photographing. The memory unit 11 is in principle reset at every operation of the shutter.

Figure 3:
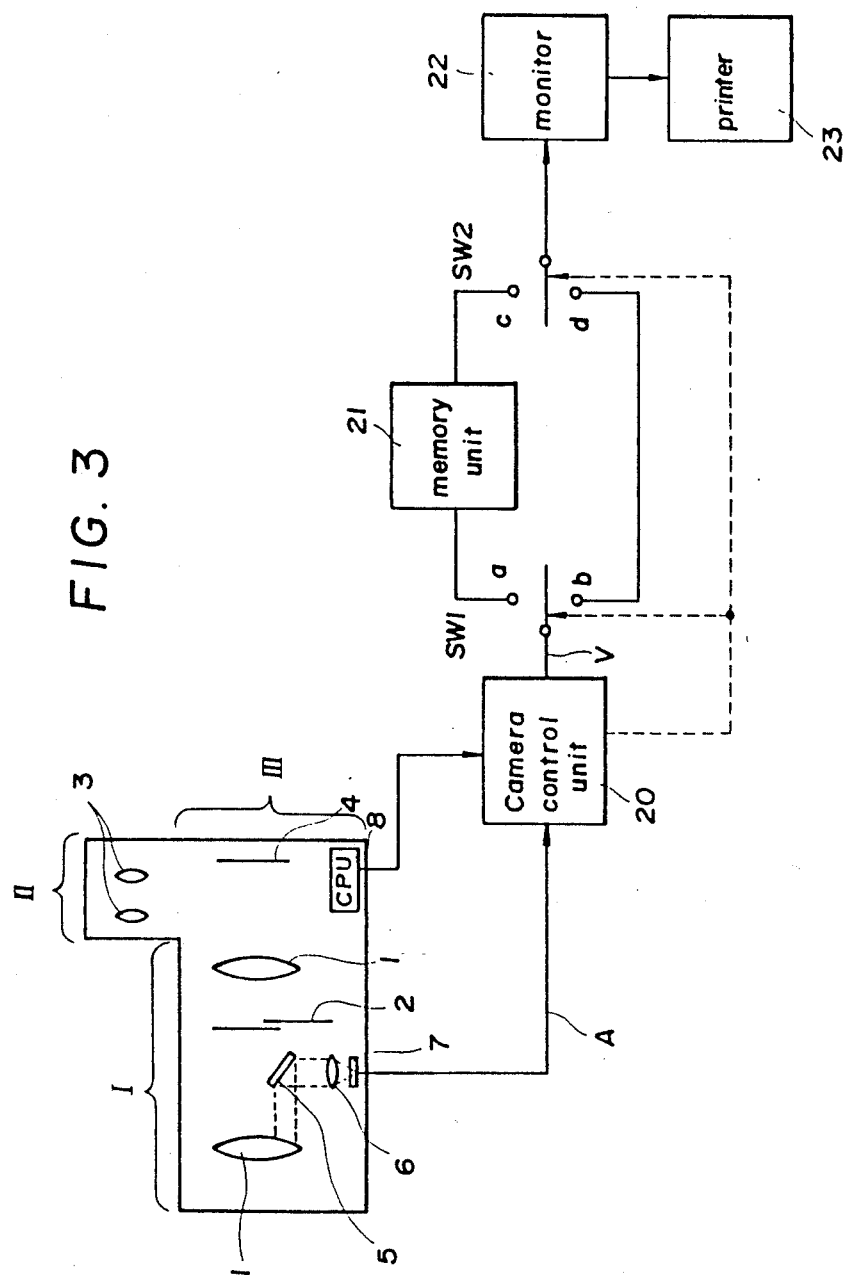
FIG. 3 is a diagrammatic view showing a second embodiment of the present invention.

FIG. 3 is a diagrammatic view showing a second embodiment of the present invention. In this embodiment, the camera unit has the same arrangement as the first embodiment, comprising camera lenses 1, a shutter-/iris stop unit 2, finder lenses 3, a mirror 5, a focusing optical system 6, an imaging device 7, and a central processing unit (CPU) 8, and a film 4 is set in position. Further, this embodiment uses a camera control unit 20, a memory unit 21, a monitor 22, a printer 23, and switches SW1 and SW2, as external devices connected to the imaging device 7.

In this embodiment, when the power switch of the camera body is turned on, the imaging device 7 is powered. With the imaging device 7 energized, when the shutter button is not pressed down, by the control of the camera control unit 20, the switch SW1 is turned to a contact b and the switch SW2 is turned to a contact d, and a picture signal A is read from the imaging device 7 at timing of every 1/60 second. The picture signal A is converted in the camera control unit 20 into a video signal V which is inputted to the monitor 22. Therefore, the image of the subject passing through the camera lenses 1 is displayed as an animated picture on the monitor 22.

With the imaging device 7 energized and during the above-described animation display, when the shutter button is pressed, a shutter-on signal is transmitted from the CPU 8 to the camera control unit 20 and, by the control of the camera control unit 20, the switch SW1 is turned to a contact a and the switch SW2 is turned to a contact c. At the same time, by the control of a camera control unit 10, reading at every 1/60 second from the imaging device 7 is stopped, and the electronic shutter is operated synchronizing with the shutter timing of the shutter/iris stop unit 2. Electrical charges accumulated on the CCD in a given shutter time are read according to an instruction signal of the camera control unit 10, and processed by the camera control unit 20 and then stored in the memory unit 21. The signal stored in the memory unit 21 is again read to be displayed as a still picture on the monitor 22 or be hard-copied by the printer 23. The image displayed as a still picture on the monitor 22 is the same as that taken by the film 4, as in the case of the first embodiment.

After displaying the subject image as a still picture on the monitor 22, when the shutter button is pressed halfway or a mode select switch disposed on the camera control unit 20 is operated, the animated picture is again displayed on the monitor 22.

Although supply of power to the imaging device 7 is made on the camera unit in the second embodiment, this may alternatively be made on an external unit including the camera control unit as in the first embodiment.

As described above, in the first embodiment, a system is described in which a still picture is observed on an external monitor in connection with the shutter button, whereas, in the second embodiment, the switches SW1 and SW2 are provided which operate in connection with the shutter button to enable observation not only of the still picture but also of the animated picture of the subject, which has passed through the camera lenses, on the monitor 22.

If read/write operation on the memory unit 21, when the animated picture is displayed on the monitor 22, is synchronous with the read pulse (1/60 second) from the CCD, the video signal (animated picture) can be transmitted from the camera control unit 20 to the monitor 22 through the memory unit 21, eliminating the need for the switches SW1 and SW2.

Figure 4:
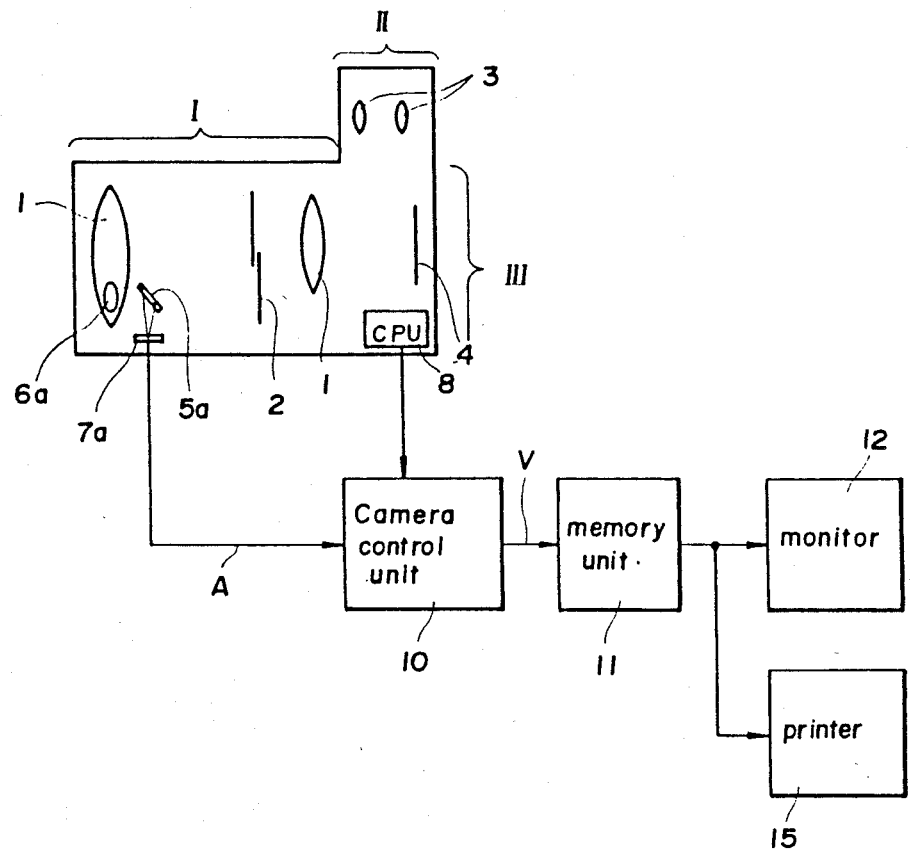
FIG. 4 is a diagrammatic view showing a third embodiment of the present invention.

FIG. 4 is diagrammatic view showing a third embodiment of the present invention. In this embodiment, of the camera lenses 1, one which is located at the subject side (front lens) is a double-focus lens, and a lens system is formed from the camera lens 1 and a combined optical system (lens) 6a. To form such a double-focus lens, the lens surface is polished so that the part to be the combined optical system 6a has a shorter focal length than other parts, or a short-focus lens to be the combined optical system 6a is embedded in a long-focus lens to be the camera lens 1. The combined optical system 6a is located at the conjugate system of the camera lens unit I. A mirror 5a, on the other hand, is located at a position where light beam passing through the combined optical system 6 is incident, to reflect the incident light beam to an imaging device 7a. The imaging device 7a is located at a position where light beam passed through the combined optical system 6a and reflected by the mirror 5a is focused to produce an image of the subject, and transmits a picture signal A corresponding to the focused subject image.

The arrangement of other parts is same as that of the first embodiment as shown in FIG. 1, in which numeral 2 indicates a shutter/iris stop unit, numeral 3 indicates finder lenses, numeral 4 indicates a film, numeral 8 indicates a central processing unit, numeral 10 indicates a camera control unit, numeral 11 indicates a memory unit, numeral 12 indicates a monitor, and numeral 13 indicates a printer.

Since, in this embodiment, the same subject image as taken by the film 4 is applied to the imaging device 7a, by the same operation as in the first embodiment, the photographed subject image can be immediately displayed on the monitor 12 or hard-copied by the printer 13 to enable checking of the image at the photographing. Furthermore, in the third embodiment, the optical path length of light beam incident upon the imaging device 7a can be decreased as compared with the first and second embodiments.

Figure 5:
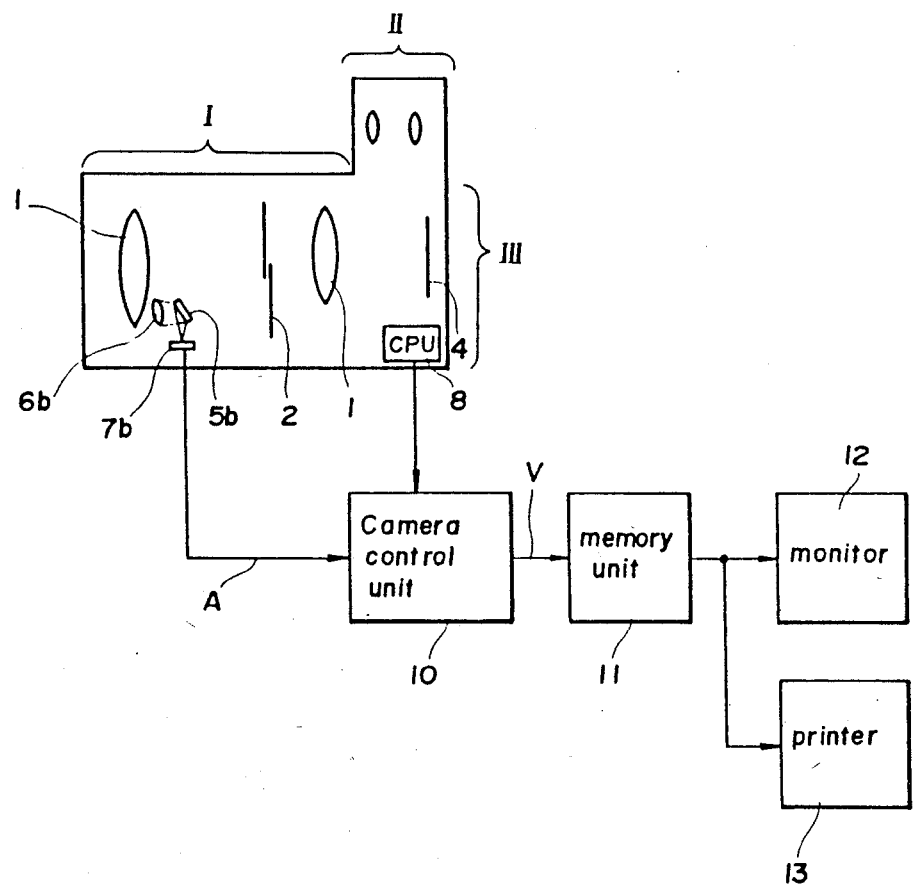
FIG. 5 is a diagrammatic view showing a fourth embodiment of the present invention.

FIG. 5 is a diagrammatic view of a fourth embodiment of the present invention. In this embodiment, a combined optical system 6b, as a separate unit from the camera lenses 1, is disposed in the conjugate system of the camera lens unit I. Light beam passed through the combined optical system 6b and reflected by a mirror 5b is focused to produce an image of the subject of an imaging device 7b. Arrangement of other parts is the same as that of the third embodiment as shown in FIG. 4. Thus, this embodiment also allows checking of the photographed image of the subject on the monitor 12 or the printer 13.

Figure 6:
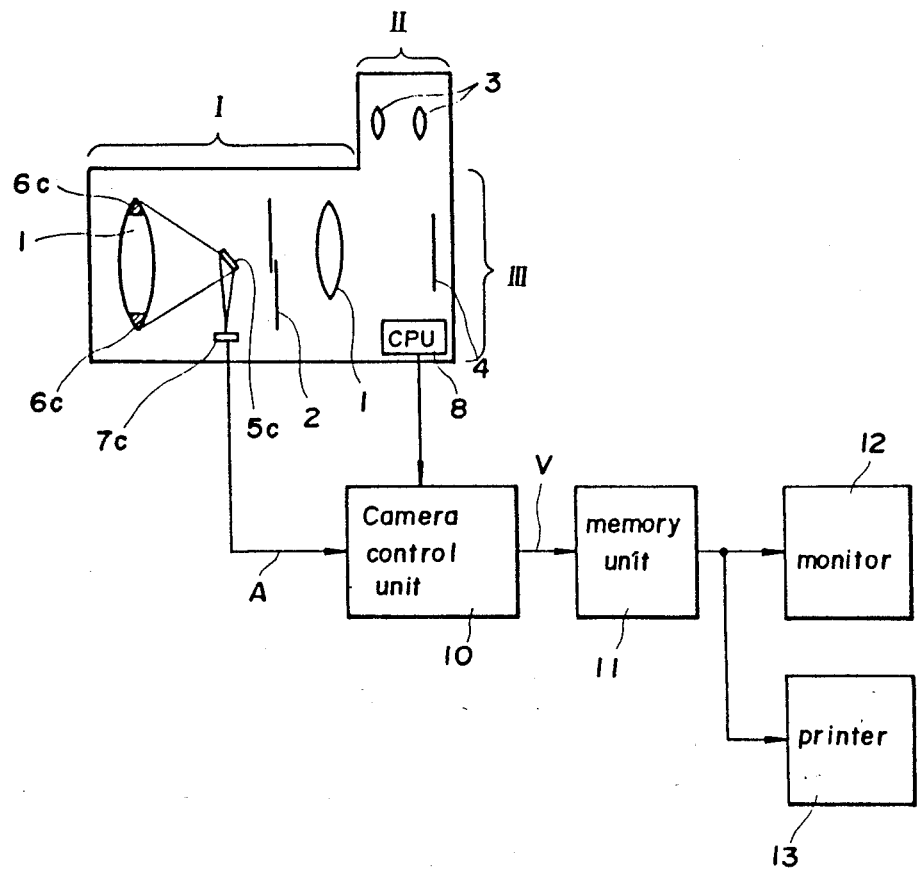
FIG. 6 is a diagrammatic view showing a fifth embodiment of the present invention.
Figure 7:
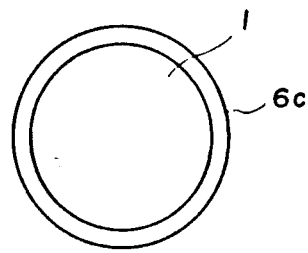
FIG. 7 is a schematic front view showing a camera lens and combined optical system used in the fifth embodiment of the present invention.
Figure 8:
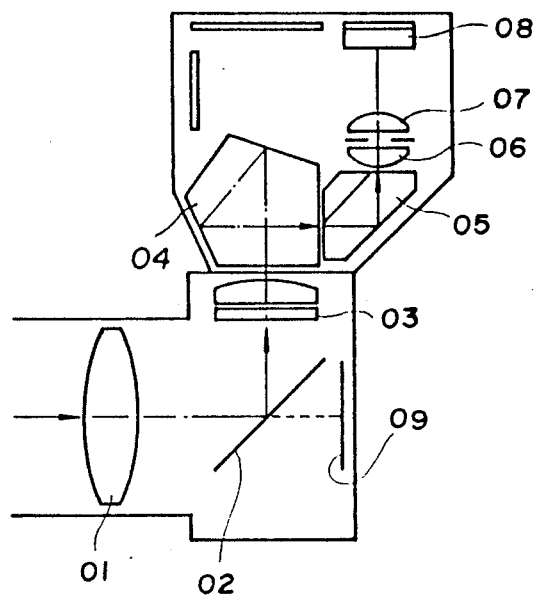
FIGS. 8, 9, and 10 are schematic views showing structures of prior art cameras with checking function.
Figure 9:
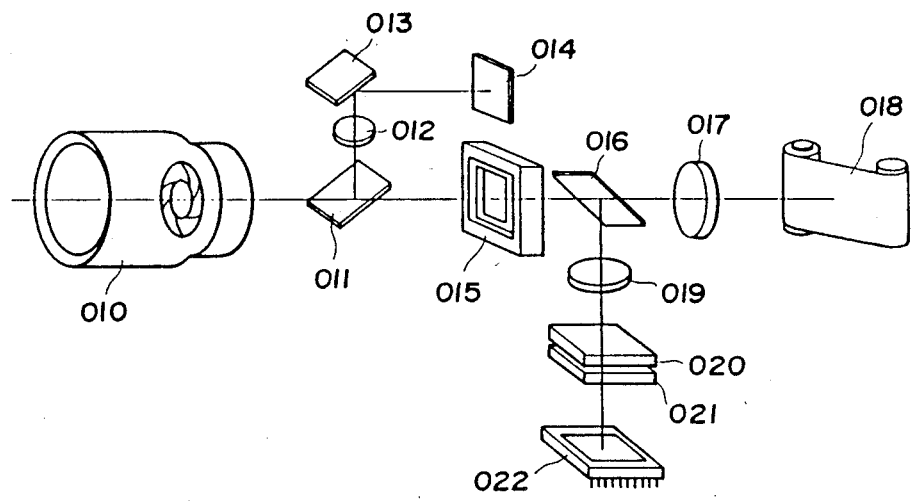
Figure 10:
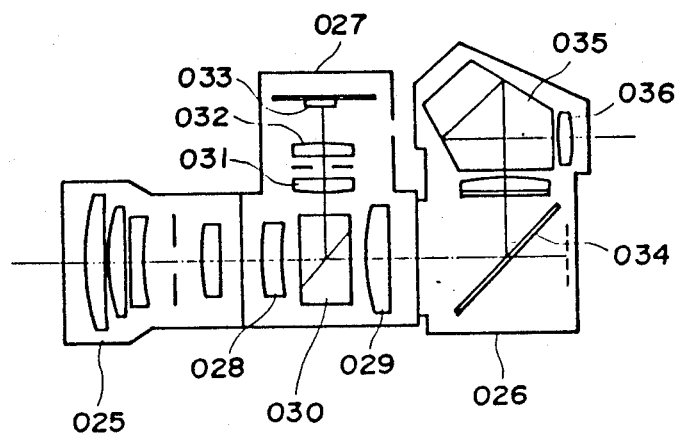

FIG. 6 is a diagrammatic view of a fifth embodiment of the present invention. In this embodiment, as shown in FIG. 7. a combined optical system 6c is integrally formed on the periphery of the camera lens 1 of the subject side. A mirror 5c is disposed on an extension of the optical axis of the camera lens 1, and light beam passed through the combined optical system 6c is reflected to an imaging device 7c to focus the subject image on the imaging device 7c. Arrangement of other parts is the same as that of the third embodiment as shown in FIG. 4. Thus, this embodiment also allows checking of the photographed image of the subject on the monitor 12 or the printer 13.

The present invention can be applied not only to lens-shutter cameras but to view cameras and single-lens reflex cameras. Incident light beam is taken out from the conjugate system of the camera lens unit and is focused to produce an image, and a picture signal corresponding to the image is outputted.

In the above-described embodiments, a total reflection mirror is used, however, alternatively, a half-mirror may be used. The mirror may alternatively be located behind the iris stop (at the film side), but in such a case, the mirror must be positioned at nearly the center of the optical path, which is not an advantageous way.

As described above in detail with reference to the embodiments, with the present invention, in a silver-halide film camera, a picture signal representing the same image as photographed on the film is outputted on the imaging device disposed in the camera lens, and the image reproduced from the picture signal can be monitored to check the photographed image during photographing.

In the conjugate system, even only a small part of the light beam can be taken out and focused to produce the entire image of the subject, which allows compact design of the mirror, the focusing optical system, and the imaging device and easy arrangement of these components.

We claim:
1. A camera having a checking function which is composed of a silver-halide-film camera with an imaging device, comprising:
   a mirror disposed at a conjugate system of a camera lens assembly for reflecting a first part of an incident light beam,
   a focusing optical system for receiving said light part of said incident light beam reflected by said mirror and for focusing an optical image, and
   an imaging device disposed at a position where said optical image is focused by said focusing optical system for outputting a picture signal corresponding to said focused optical image, while simultaneously a second part of said incident light beam records an image on said silver-halide-film.

2. A camera having a checking function which is composed of a silver-halide-film camera with an imaging device, comprising:
   a combined optical system disposed at a conjugate system of a camera lens assembly for receiving a first part of an incident light beam and focusing an optical image;
   a mirror for reflecting said first part of said incident light beam passed through said combined optical system in a direction different from an optical axis of said incident light beam, and
   an imaging device disposed at a position where said light beam passed through said combined optical system and reflecting by said mirror is focused into an optical image for outputting a picture signal corresponding to said focused optical image, while simultaneously a second part of said incident light beam records an image on said silver-halide-film.

3. A camera having a checking function as claimed in claim 1, wherein said picture signal is converted into a video signal for display on a monitor or printing on a printer.

4. A camera having a checking function as claimed in claim 1, wherein said picture signal corresponding to said focused optical image is continuously displayed on a monitor as an animated picture of said image.

5. A camera having a checking function as claimed in claim 2, wherein said combined optical system comprises a double-focus lens.

6. A camera having a checking function as claimed in claim 2, wherein said combined optical system comprises a separate unit from camera lenses.

7. A camera having a checking function as claimed in claim 2, wherein said combined optical system is integrally formed on the periphery of a camera lens of the subject side.

* * * * *